(12) United States Patent
Saito (10) Patent No.: US 9,643,655 B2
(45) Date of Patent: May 9, 2017

(54) VEHICLE SIDE PORTION STRUCTURE (71) Applicant: TOYOTA JIDOSHA KABUSHIKI KAISHA, Toyota-shi, Aichi-ken (JP)

(72) Inventor: Kentaro Saito, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/057,373

(22) Filed: Mar. 1, 2016

(65) Prior Publication Data

US 2016/0264183 A1    Sep. 15, 2016

(30) Foreign Application Priority Data

Mar. 11, 2015    (JP) ................................. 2015-048619

(51) Int. Cl.
  *B62D 25/06* (2006.01)
  *B62D 25/04* (2006.01)
(52) U.S. Cl.
  CPC ............. *B62D 25/06* (2013.01); *B62D 25/04* (2013.01)
(58) Field of Classification Search
  CPC ....... B62D 25/06; B62D 24/04; B62D 27/023
  USPC ............ 296/187.13, 203.03, 29, 30, 193.05, 296/193.06
  See application file for complete search history.

(56) References Cited

U.S. PATENT DOCUMENTS

| | | | | |
|---|---|---|---|---|
| 6,962,389 B2 * | 11/2005 | Katsuma | ................ | B62D 25/06 296/187.12 |
| 6,976,730 B2 * | 12/2005 | Mally | .................... | B62D 25/06 296/203.03 |
| 7,121,615 B2 * | 10/2006 | Hoshino | ................ | B62D 25/06 296/187.12 |
| 7,407,222 B2 * | 8/2008 | Anderson | ............. | B62D 25/06 296/193.05 |
| 2003/0141747 A1 | 7/2003 | Honma et al. | | |
| 2012/0256445 A1 * | 10/2012 | Baccouche | ............ | B62D 25/04 296/193.06 |
| 2016/0039471 A1 * | 2/2016 | Bach | ..................... | B62D 25/06 296/193.06 |

FOREIGN PATENT DOCUMENTS

| | | | |
|---|---|---|---|
| JP | 2003-212148 A | | 7/2003 |
| JP | 2007131054 A | * | 5/2007 |
| JP | 2010-167978 A | | 8/2010 |

* cited by examiner

*Primary Examiner* — Pinel Romain
(74) *Attorney, Agent, or Firm* — Oliff PLC (57) ABSTRACT

A reinforcement patch is disposed at a vehicle inner side of a rail outer. The reinforcement patch includes an upper reinforcing portion and a lower reinforcing portion. At a boundary region between the upper reinforcing portion and the lower reinforcing portion, a reinforcement front-and-rear ridgeline is formed along an outer ridgeline. Spaced apart beads are formed at the reinforcement front-and-rear ridgeline.

6 Claims, 6 Drawing Sheets

VEHICLE SIDE PORTION STRUCTURE

CROSS-REFERENCE TO RELATED APPLICATION

This application claims priority under 35 USC 119 from Japanese Patent Application No. 2015-048619 filed on Mar. 11, 2015, the disclosure of which is incorporated by reference herein.

BACKGROUND OF THE INVENTION

Technical Field

The present invention relates to a vehicle side portion structure.

Related Art

Japanese Patent Application Laid-Open (JP-A) No. 2010-167978 discloses a joining portion structure between a roof side rail and a center pillar (also referred to as "the B pillar"). In JP-A No. 2010-167978, an upper end portion of a pillar stiffener is joined to the roof side rail and the roof side rail is joined to the center pillar.

An upper wall of the roof side rail and the upper end portion of the pillar stiffener are disposed in a horizontal direction. Therefore, deformation of the roof side rail and the center pillar to the vehicle inner side in response to input of a load from sideward is suppressed.

However, in a structure based on the joining structure recited in JP-A No. 2010-167978, depending on the direction of input of an impact load when there is a side collision, a roof side rail outer with a cross-sectional shape that protrudes to the vehicle width direction outer side is deformed such that a ridgeline formed in the front-and-rear direction displaces to the vehicle inner side and the cross section opens up. Thus, there is further scope for improvement in suppressing deformation, including this deformation, to the vehicle inner side when there is a side collision.

SUMMARY

In consideration of the circumstances described above, an object of the present invention is to provide a vehicle side portion structure that may suppress deformation of a roof side rail to a vehicle cabin inner side direction when there is a side collision.

In order to achieve the above object, a vehicle side portion structure according to a first aspect of the present invention includes: a roof side rail including a rail outer reinforcement that extends in a vehicle front-and-rear direction, a cross-sectional shape of which protrudes to a vehicle width direction outer side, the cross-sectional shape being structured by an upper wall portion and a lower wall portion, and an outer ridgeline being formed between the upper wall portion and the lower wall portion, and a rail inner panel that is disposed at a vehicle inner side relative to the rail outer reinforcement and that forms a closed cross section between the rail outer reinforcement and the rail inner panel; a pillar that extends in a vehicle up-and-down direction at a vehicle side portion, an upper end portion of the pillar being joined to the vehicle width direction outer side of the rail outer reinforcement; and a reinforcement member that is disposed along the rail outer reinforcement at the vehicle inner side of the rail outer reinforcement, the reinforcement member including an upper reinforcing portion that is disposed along the upper wall portion, a lower reinforcing portion that is disposed along the lower wall portion, a reinforcement front-and-rear ridgeline along the outer ridgeline between the upper reinforcing portion and the lower reinforcing portion, and a bead that protrudes to the vehicle inner side relative to the reinforcement front-and-rear ridgeline and connects between the upper reinforcing portion and the lower reinforcing portion.

In the vehicle side portion structure of the first aspect, when a load toward the vehicle inner side is inputted to the pillar by a side collision or the like, the load is transmitted to the rail outer reinforcement to which the upper end portion of the pillar is joined. Hence, a force acts to displace the outer ridgeline between the upper wall portion and the lower wall portion to the vehicle width direction inner side and deform the outer ridgeline to open up to the vehicle width direction inner side. However, the bead formed at the reinforcement member protrudes to the vehicle inner side from the reinforcement front-and-rear ridgeline and connects the upper reinforcing portion arranged along the upper wall portion with the lower reinforcing portion arranged along the lower wall portion. Therefore, in response to the input of the load, the bead is tensed between the upper reinforcing portion and the lower reinforcing portion and acts to maintain the distance between the two reinforcing portions. Thus, a deformation in which the upper wall portion and lower wall portion open apart may be effectively suppressed.

Because the reinforcement member reinforced by the bead is disposed at the vehicle width direction inner side of the pillar and the rail outer reinforcement, the joining region between the rail outer reinforcement and the pillar may be reinforced efficiently.

In a vehicle side portion structure according to a second aspect of the present invention, a pair of pillar up-and-down ridgelines are formed at the pillar, the pillar up-and-down ridgelines being spaced apart from one another in the vehicle front-and-rear direction and extending in the vehicle up-and-down direction, and the bead is disposed in a region between projection lines of the pair of pillar up-and-down ridgelines.

According to the vehicle side portion structure according to the second aspect, the bead is disposed in the region between projection lines, which is between lines projected from the pair of pillar up-and-down ridgelines, at which stresses tend to concentrate when there is a side collision. Therefore, strength of the joining region between the rail outer reinforcement and the pillar may be raised effectively.

In a vehicle side portion structure according to a third aspect of the present invention, the bead is plurally formed in the region between projection lines, the beads being spaced apart.

According to the vehicle side portion structure according to the third aspect, the bead is plurally divided in the region between projection lines. Therefore, the ridgeline formed in the vehicle front-and-rear direction is divided into parts by the beads.

In a vehicle side portion structure according to a fourth aspect of the present invention, the bead is formed at at least one of the vehicle front-and-rear direction front side or rear side relative to the region between projection lines.

According to the vehicle side portion structure according to the fourth aspect, the bead is formed both in the region between projection lines and at the vehicle front side, the vehicle rear side, or both the vehicle front side and rear side relative to the region between projection lines. Therefore, the joining region between the rail outer reinforcement and the pillar may be reinforced efficiently.

In a vehicle side portion structure according to a fifth aspect of the present invention, the upper end portion of the pillar, the rail outer reinforcement and the reinforcement member are integrally joined.

According to the vehicle side portion structure according to the fifth aspect, stiffness of the joining region between the rail outer reinforcement and the pillar is raised. Thus, when there is a side collision, a deformation such that a region in which the pillar front-and-rear ridgeline, the outer ridgeline and the reinforcement front-and-rear ridgeline are superposed opens up to the vehicle inner side may be effectively suppressed.

In a vehicle side portion structure according to a sixth aspect of the present invention, both vehicle up-and-down direction end portions of the bead are disposed at positions that are equidistant from the reinforcement front-and-rear ridgeline.

According to the vehicle side portion structure according to the sixth aspect, because a load when there is a side collision is inputted to the bead in a well-balanced manner, a deformation such that the region in which the pillar front-and-rear ridgeline, the outer ridgeline and the reinforcement front-and-rear ridgeline are superposed opens up to the vehicle inner side may be effectively suppressed.

ADVANTAGEOUS EFFECTS OF INVENTION

According to the vehicle side portion structure according to the first aspect, deformation of the roof side rail to the vehicle cabin inner side direction when there is a side collision may be suppressed.

According to the vehicle side portion structure according to the second aspect, deformation of the roof side rail to the vehicle cabin inner side direction when there is a side collision may be suppressed effectively.

According to the vehicle side portion structure according to the third aspect, the rail outer reinforcement may be reinforced effectively.

According to the vehicle side portion structures according to the fourth to sixth aspects, deformation of the rail outer reinforcement to the vehicle cabin inner side direction when there is a side collision may be suppressed even more effectively.

BRIEF DESCRIPTION OF THE DRAWINGS

Embodiments of the present invention will be described in detail based on the following figures, wherein.

DETAILED DESCRIPTION OF THE INVENTION

Herebelow, an exemplary embodiment of the vehicle side portion structure according to the present invention is described using FIG. 1 to FIG. 5. The arrow UP that is shown as appropriate in the drawings indicates a vehicle body upper direction, an arrow FR indicates a vehicle body front direction, and an arrow IN indicates a vehicle width inner side direction.

Figure 1:
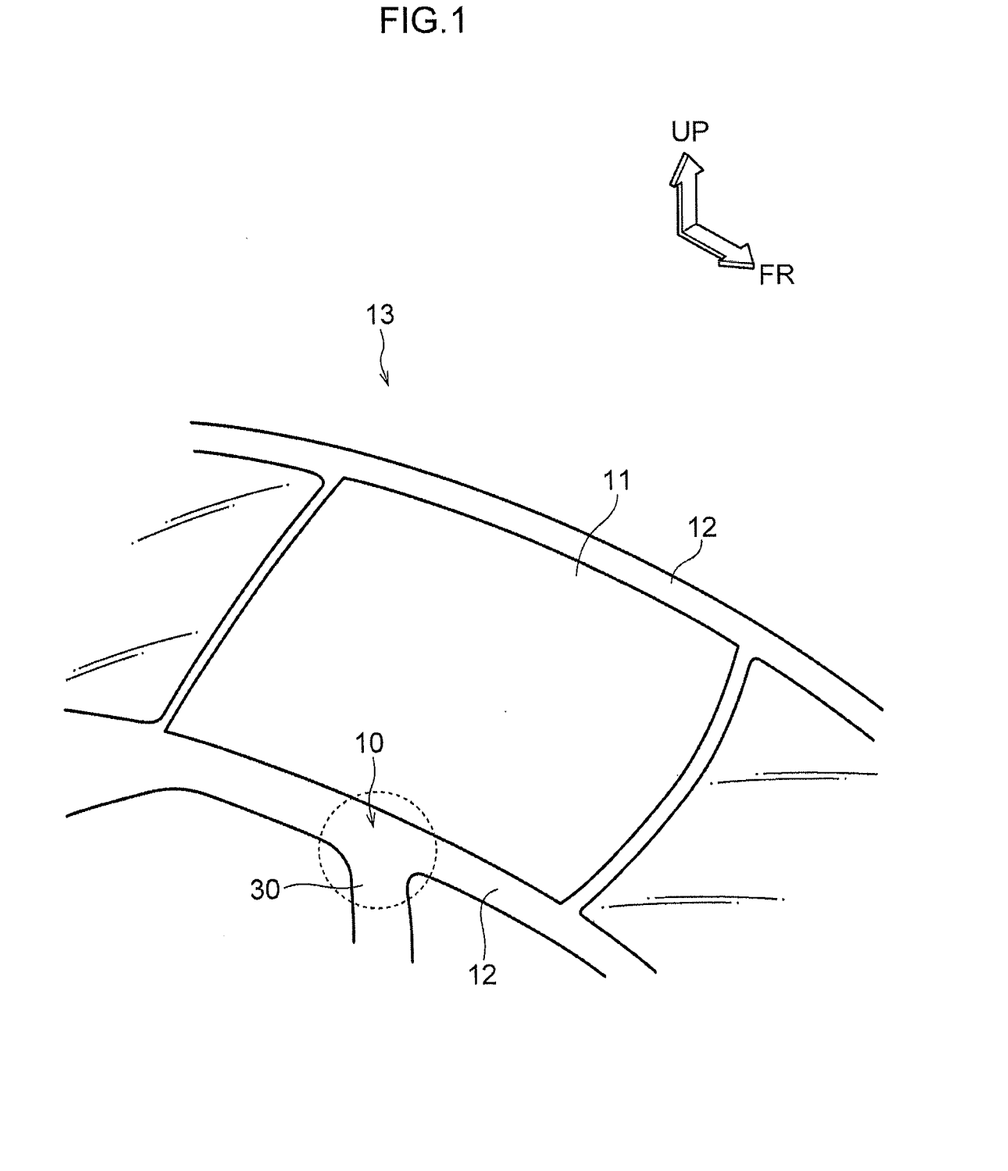
FIG. 1 is a perspective view showing an upper side portion of a vehicle at which a vehicle side portion structure in accordance with the present invention is employed.
Figure 2:
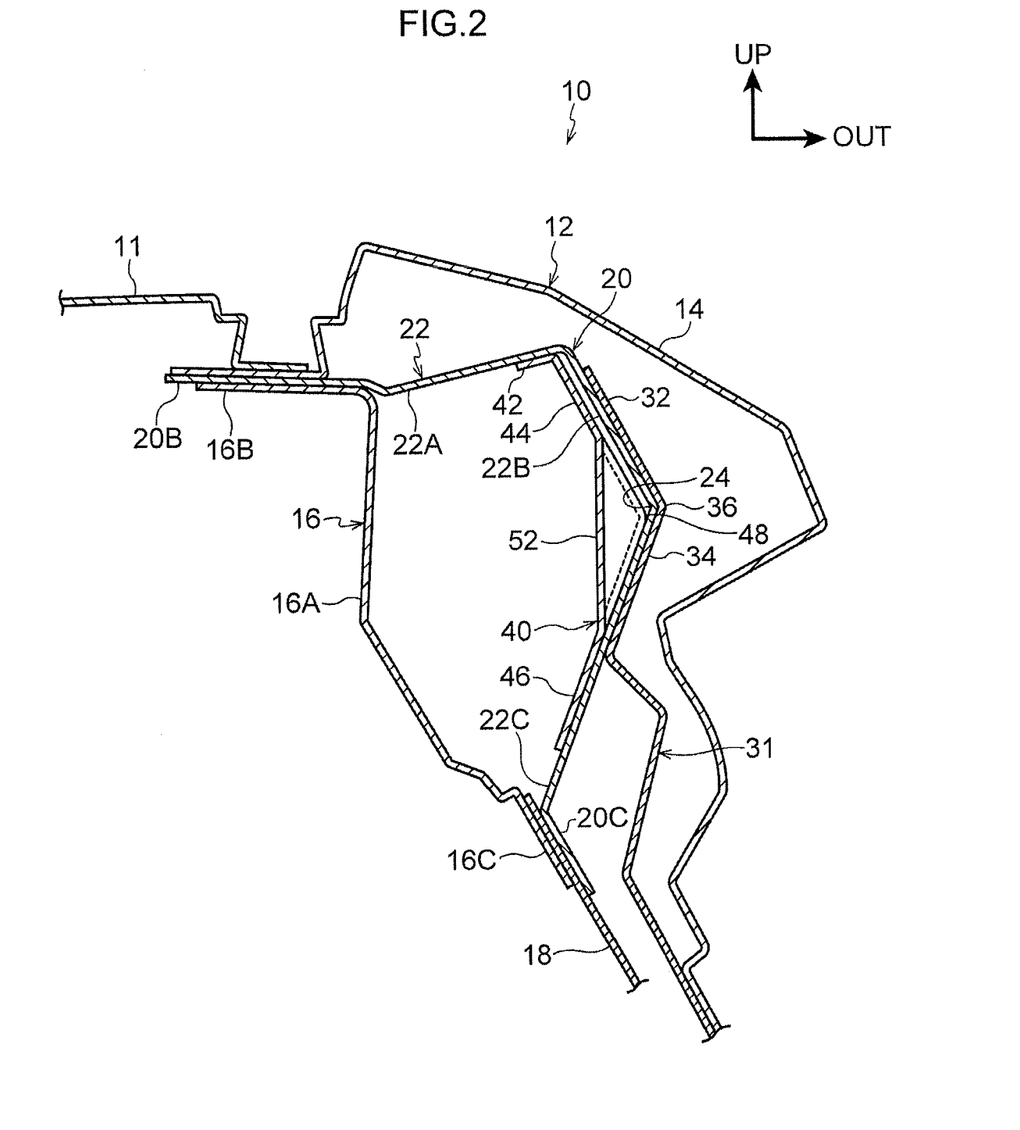
FIG. 2 is a sectional view cut along line A-A in FIG. 3.

FIG. 1 is a perspective view showing an upper side portion of a vehicle at which a vehicle side portion structure 10 according to the present exemplary embodiment is employed. FIG. 2 shows a sectional view taken along line A-A of FIG. 1.

As shown in FIG. 1, a vehicle roof 13 includes a roof panel 11 and roof side rails 12. The roof panel 11 covers a cabin. The roof side rails 12 are provided at each of two vehicle width direction sides. An upper portion outer shell of the vehicle is structured by the roof panel 11. The roof side rails 12 are disposed along the vehicle front-and-rear direction as a pair at left and right. At a middle portion of each roof side rail 12, an upper portion of a center pillar 30 is joined thereto. Each center pillar 30 is disposed in the vehicle up-and-down direction.

As illustrated in FIG. 2, each roof side rail roof side rail 12 is structured with a side outer panel 14, a rail outer reinforcement 20 (below referred to as "the rail outer 20") and a rail inner panel 16 (below referred to as "the rail inner 16"). The rail inner 16 is disposed at the vehicle inner side, and the rail outer 20 is disposed at the vehicle outer side relative to the rail inner 16. A closed cross section is formed by the rail inner 16 and the rail outer 20. The side outer panel 14 is disposed at the vehicle outer side of the rail outer 20.

The rail inner 16 is structured by a main body portion 16A, an inner side flange portion 16B and an outer side flange portion 16C. The main body portion 16A forms a closed cross section with the rail outer 20. The inner side flange portion 16B is inflected substantially horizontally to the vehicle width direction inner side from an inner end portion of the main body portion 16A. The outer side flange portion 16C is inflected diagonally downward-outward from an outer end portion of the main body portion 16A.

The rail outer 20 includes a rail main body portion 22 with a rectangular cross section, the vehicle inner side of which is open. The rail main body portion 22 is disposed to oppose the main body portion 16A of the rail inner 16. The rail main body portion 22 is structured by an upper main body portion 22A, an upper wall portion 22B and a lower wall portion 22C. The upper main body portion 22A structures an inner end side upper portion of the rail main body portion 22. The upper wall portion 22B is inflected diagonally downward toward the vehicle outer side from an outer end of the upper main body portion 22A. The lower wall portion 22C is inflected diagonally downward toward the vehicle inner side from an outer end of the upper wall portion 22B. The rail outer 20 further includes an inner side flange portion 20B and an outer side flange portion 20C. The inner side flange portion 20B is inflected substantially horizontally to the vehicle width direction inner side from an inner end portion of the upper main body portion 22A. The outer side flange portion 20C is inflected diagonally downward-outward from a lower end portion of the lower wall portion 22C. An inner side flange portion 14B is joined to the inner side flange portion 16B, and the outer side flange portion 20C is joined to the outer side flange portion 16C. At the location shown in FIG. 2, the outer side flange portion 20C and the outer side flange portion 16C are joined via a center pillar inner 18. The upper wall portion 22B and lower wall portion 22C of the rail outer 20 have a cross section that protrudes to the vehicle width direction outer side, and an outer ridgeline 24 is formed between the upper wall portion 22B and the lower wall portion 22C. The outer ridgeline 24 extends in the vehicle front-and-rear direction.

A center pillar outer 31 that structures the center pillar 30 is disposed at the vehicle outer side of the rail outer 20. The center pillar outer 31 extends in the vehicle up-and-down direction and includes a pillar first upper end portion 32 and a pillar second upper end portion 34. The pillar first upper end portion 32 is disposed along the outer side of the upper wall portion 22B. The pillar second upper end portion 34 is inflected diagonally downward toward the vehicle inner side from a lower end of the pillar first upper end portion 32 and is disposed along the lower wall portion 22C. A pillar front-and-rear ridgeline 36 is formed between the pillar first upper end portion 32 and pillar second upper end portion 34 that form a protrusion to the vehicle width direction outer side. The pillar front-and-rear ridgeline 36 is arranged in the vehicle front-and-rear direction along the outer ridgeline 24.

Figure 3:
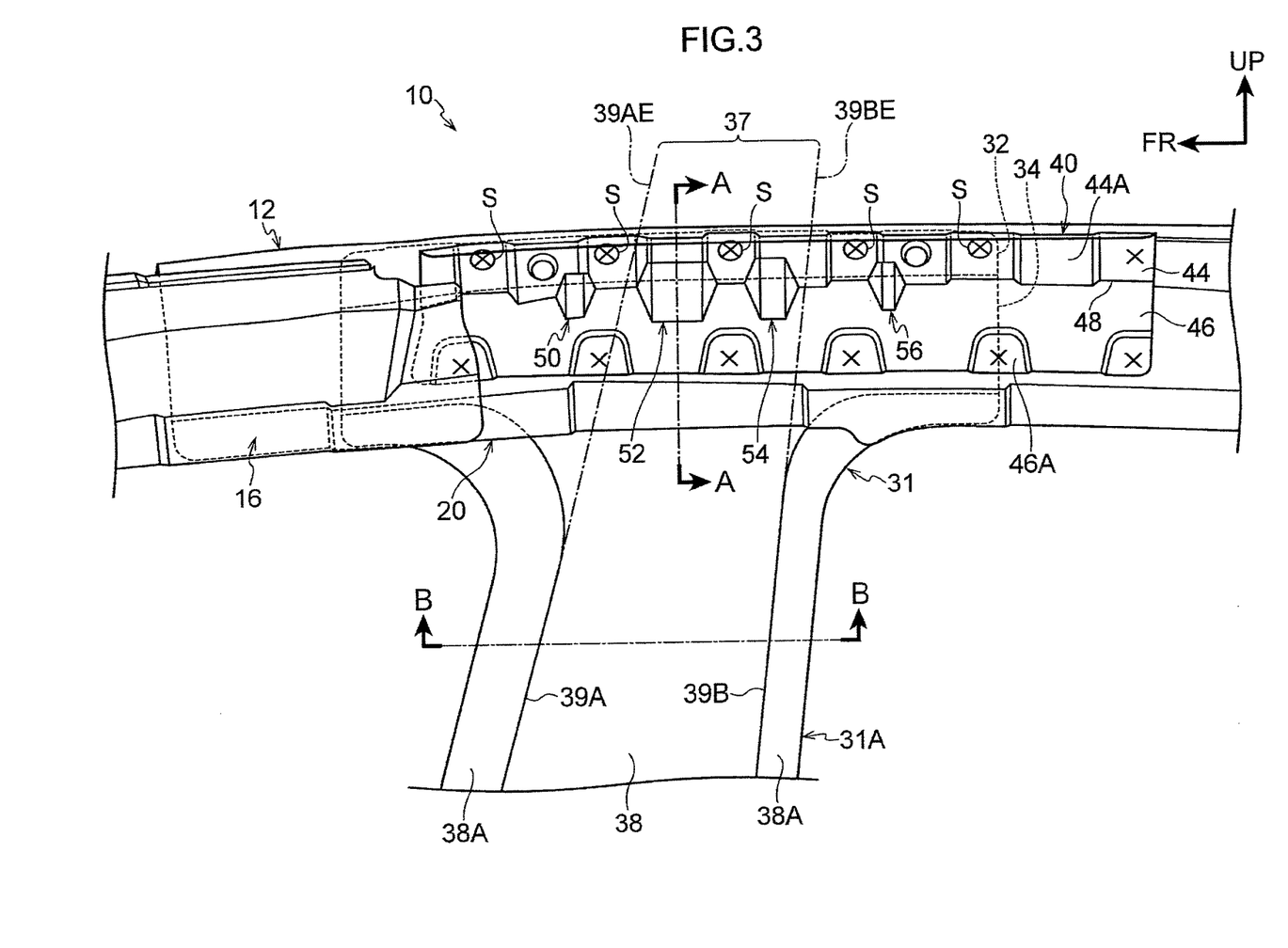
FIG. 3 is a partial cutaway plan view in which the vehicle side portion structure in accordance with the present invention is viewed from a vehicle inner side.
Figure 4:
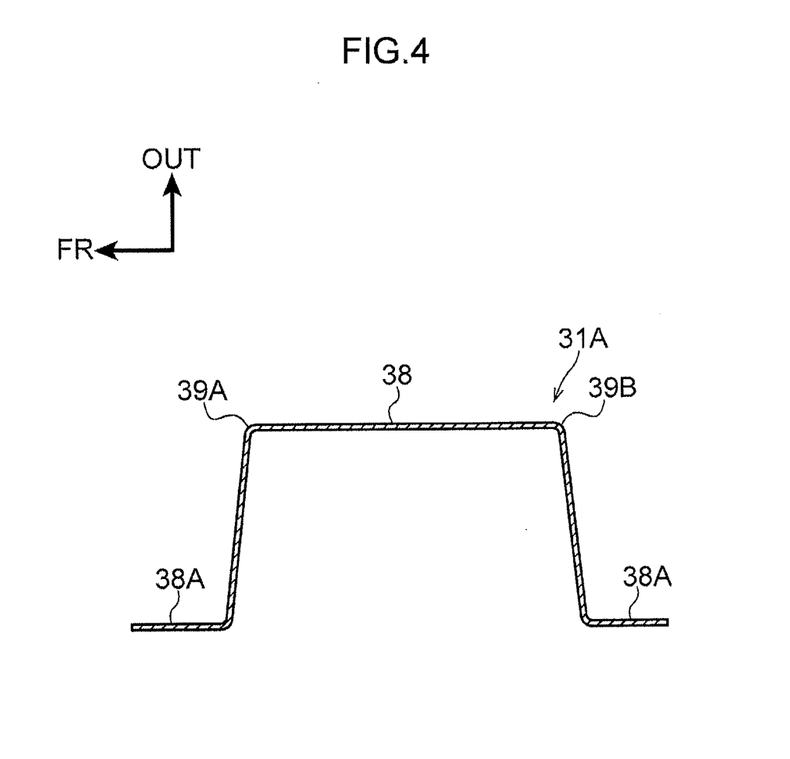
FIG. 4 is a sectional view cut along line B-B in FIG. 3.

As shown in FIG. 3, the center pillar outer 31 extends in the vehicle up-and-down direction and, at the upper end portion thereof that is joined to the rail outer 20, widens out in the vehicle front-and-rear direction. A pillar main body portion 31A is at the vehicle lower side relative to the region at which the center pillar outer 31 and the rail outer 20 are joined. As shown in FIG. 4, the pillar main body portion 31A is formed in a hat shape in cross section. A protrusion portion 38 is formed at the pillar main body portion 31A. The protrusion portion 38 forms a protrusion shape toward the vehicle width direction outer side. Flange portions 38A are formed at both of the vehicle front-and-rear direction end portions of the protrusion portion 38. A pair of pillar up-and-down ridgelines 39A and 39B are formed at the protrusion portion 38, at two inflection regions that form the protrusion shapes.

Figure 5:
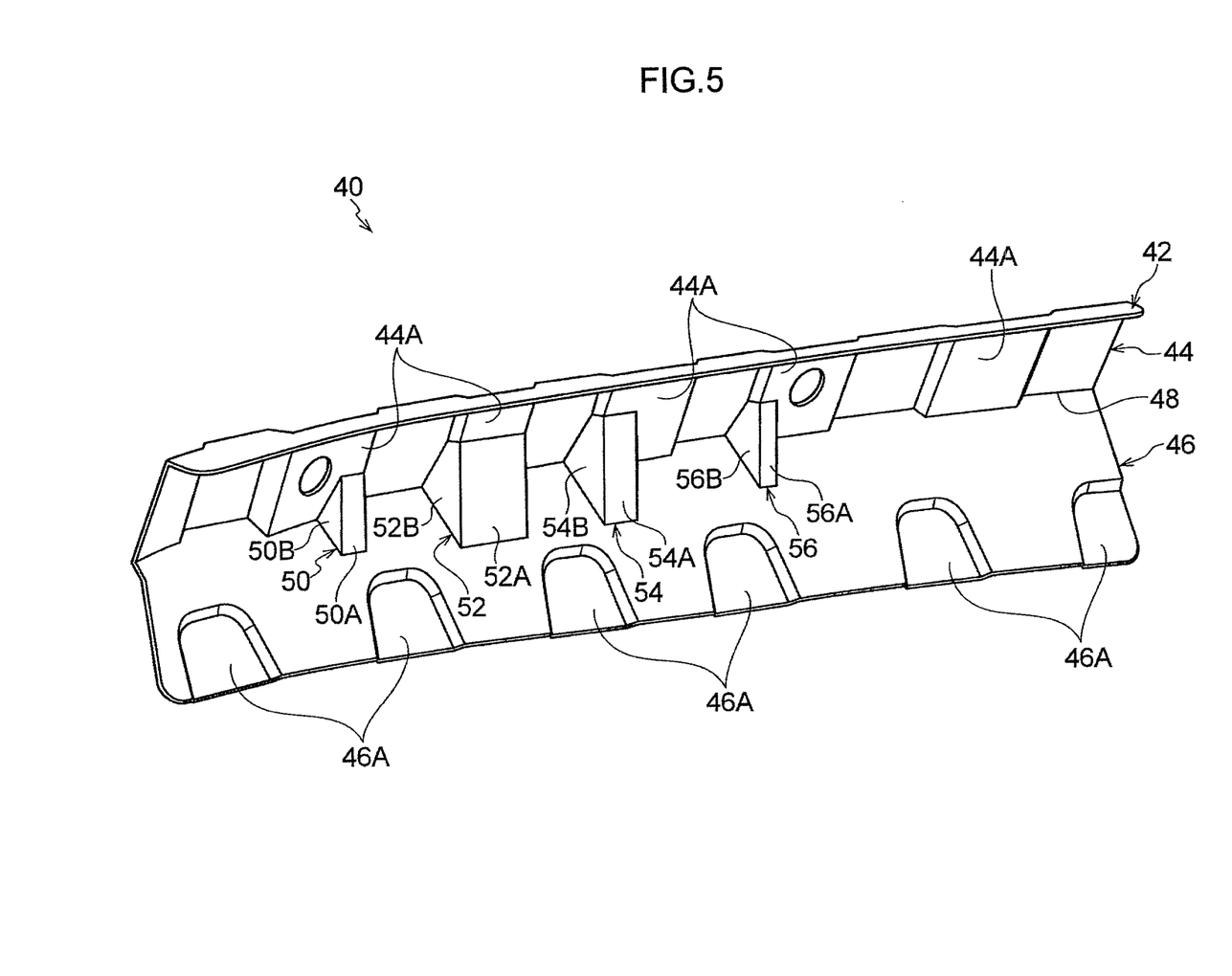
FIG. 5 is a perspective view of a reinforcement patch in accordance with a present exemplary embodiment.

As shown in FIG. 2, a reinforcement patch 40 is disposed at the vehicle inner side of the rail outer 20. As is also shown in FIG. 5, the reinforcement patch 40 is formed in a plate shape and includes an end portion 42, an upper reinforcing portion 44 and a lower reinforcing portion 46. The end portion 42 is disposed along the upper main body portion 22A. The upper reinforcing portion 44 is disposed along the upper wall portion 22B. The lower reinforcing portion 46 is disposed along the lower wall portion 22C. As shown in FIG. 3, a vehicle rear end of the reinforcement patch 40 is disposed at the rear side relative to the vehicle rear end of the center pillar outer 31.

The upper reinforcing portion 44 is inflected diagonally downward toward the vehicle outer side from the outer end of the end portion 42. As shown in FIG. 5, upper protrusion portions 44A that protrude to the vehicle inner side are plurally formed at the upper reinforcing portion 44, spaced apart in the vehicle front-and-rear direction. The lower reinforcing portion 46 is inflected diagonally downward toward the vehicle inner side from the lower end of the upper reinforcing portion 44. Lower recess portions 46A that are recessed from the vehicle inner side are plurally formed at the lower side of the lower reinforcing portion 46. A reinforcement front-and-rear ridgeline 48 is formed along the vehicle front-and-rear direction at a boundary region between the upper reinforcing portion 44 and the lower reinforcing portion 46. The reinforcement front-and-rear ridgeline 48 is arranged along the outer ridgeline 24.

Four beads 50, 52, 54 and 56 are formed between the upper reinforcing portion 44 and the lower reinforcing portion 46. The beads 50 to 56 are arrayed along the reinforcement front-and-rear ridgeline 48, spaced apart from one another. The bead 50 is disposed at the vehicle front side relative to a projection line 39AE of the pillar up-and-down ridgeline 39A that is at the vehicle front side. The bead 52 and the bead 54 are disposed in a region between the projection line 39AE and a projection line 39BE of the pair of pillar up-and-down ridgelines 39A and 39B (below referred to as "the region between projection lines 37"), that is, in a region that is at the vehicle rear side relative to the projection line 39AE of the pillar up-and-down ridgeline 39A and at the vehicle front side relative to the projection line 39BE of the pillar up-and-down ridgeline 39B. The bead 56 is disposed at the vehicle rear side relative to the projection line 39BE of the pillar up-and-down ridgeline 39B.

The beads 50 to 56 protrude to the vehicle width direction inner side relative to the reinforcement front-and-rear ridgeline 48 and include, respectively, top face portions 50A, 52A, 54A and 56A and side face portions 50B, 52B, 54B and 56B. The top face portions 50A, 52A, 54A and 56A are formed in rectangular plate shapes, upper ends of which are disposed at the upper protrusion portions 44A and lower ends of which are disposed at a middle region of the lower reinforcing portion 46. The top face portions 50A, 52A, 54A and 56A are formed to connect between the upper reinforcing portion 44 and the lower reinforcing portion 46. The side face portions 50B, 52B, 54B and 56B extend to general surfaces of the upper reinforcing portion 44 and the lower reinforcing portion 46 from edges at both of vehicle front-and-rear direction ends of the top face portions 50A, 52A, 54A and 56A. The lengths of boundary regions between the side face portions 50B, 52B, 54B and 56B and the upper reinforcing portion 44 (lengths from the reinforcement front-and-rear ridgeline 48 to upper ends of the side face portions) are substantially equal to lengths of boundary regions between the side face portions 50B, 52B, 54B and 56B and the lower reinforcing portion 46 (lengths from the reinforcement front-and-rear ridgeline 48 to lower ends of the side face portions). Thus, the side face portions 50B, 52B, 54B and 56B are formed substantially in isosceles triangle shapes. The reinforcement front-and-rear ridgeline 48 is divided into parts by the beads 50 to 56.

The center pillar outer 31, the rail outer 20 and the reinforcement patch 40 are joined by spot welding to regions at which the pillar first upper end portion 32, the upper wall portion 22B and the upper protrusion portions 44A of the upper reinforcing portion 44 are not formed (i.e., to a general surface of the upper reinforcing portion 44. As shown in FIG. 3, spots S of the spot welding are disposed at positions that do not coincide in the vehicle front-and-rear and up-and-down directions.

Now, operation and effects of the present exemplary embodiment are described.

When a load is inputted to the center pillar 30 through the side face of the vehicle by a side collision or the like, the load is transmitted to the rail outer 20 to which the upper end portion of the center pillar 30 (the pillar first upper end portion 32 and pillar second upper end portion 34) is joined. The load acts so as to open up the vehicle width direction inner side of a region in which the outer ridgeline 24 and the pillar front-and-rear ridgeline 36 are superposed. However, in the present exemplary embodiment, the beads 50, 52, 54 and 56 formed at the reinforcement patch 40 protrude to the vehicle width direction inner side relative to the reinforcement front-and-rear ridgeline 48 and connect between the upper reinforcing portion 44 and the lower reinforcing portion 46. Therefore, in response to the above-described input of the load, the beads 50, 52, 54 and 56 are tensed between the upper reinforcing portion 44 and the lower reinforcing portion 46 and act to maintain the distance between the two. Thus, a deformation opening up the vehicle inner side of the region at which the pillar front-and-rear ridgeline, the outer ridgeline and the reinforcement front-and-rear ridgeline are superposed may be effectively suppressed.

In the present exemplary embodiment, because the reinforcement patch 40 is disposed at the vehicle width direction inner side of the rail outer 20 and raises the strength thereof, a deformation of the pillar upper portion to the vehicle cabin inner side direction when there is a side collision may be suppressed.

Furthermore, in the present exemplary embodiment, the beads 50, 52, 54 and 56 of the reinforcement patch 40 are disposed at positions that do not coincide with the projection lines 39AE and 39BE. Therefore, ridgelines are formed by the beads to avoid projection lines of the pillar up-and-down ridgelines 39A and 39B at which stresses tend to concentrate, and concentrations of stress due to the formation of the beads may be moderated.

In the present exemplary embodiment, the beads 52 and 54 are formed in the region between projection lines 37 that is between the projection lines 39AE and 39BE at which stresses tend to concentrate when there is a side collision. Therefore, the joining region between the rail outer 20 and the center pillar 30 may be effectively and efficiently reinforced.

The beads 52 and 54 are disposed apart from one another. Therefore, ridgelines of the beads 52 and 54 are not continuous in straight lines in the vehicle front-and-rear direction, and concentrations of stress at the ridgelines due to the formation of the beads may be moderated.

In the present exemplary embodiment, the beads 50 and 56 are formed outside the region between projection lines 37, that is, at the vehicle front side of the projection line 39AE and the vehicle rear side of the projection line 39BE. Therefore, the joining region between the rail outer 20 and the center pillar outer 31 may be reinforced efficiently.

In the present exemplary embodiment, the pillar first upper end portion 32, the upper main body portion 22A and the upper reinforcing portion 44 are integrally joined by welding. Thus, the strength and stiffness of the region of joining between the rail outer 20 and the center pillar outer 31 may be raised. Hence, when there is a side collision, a deformation so as to open up the vehicle inner side of the region in which the pillar front-and-rear ridgeline 36, the outer ridgeline 24 and the reinforcement front-and-rear ridgeline 48 are superposed may be suppressed effectively.

In the present exemplary embodiment, the respective side face portions 50B, 52B, 54B and 56B of the beads 50, 52, 54 and 56 are formed in isosceles triangle shapes. Therefore, the load when there is a side collision may be inputted to the beads 50, 52, 54 and 56 in a well-balanced manner. Thus, a deformation so as to open apart the vehicle inner sides of the upper wall portion 22B and lower wall portion 22C of the rail outer 20 may be suppressed effectively.

Figure 6:
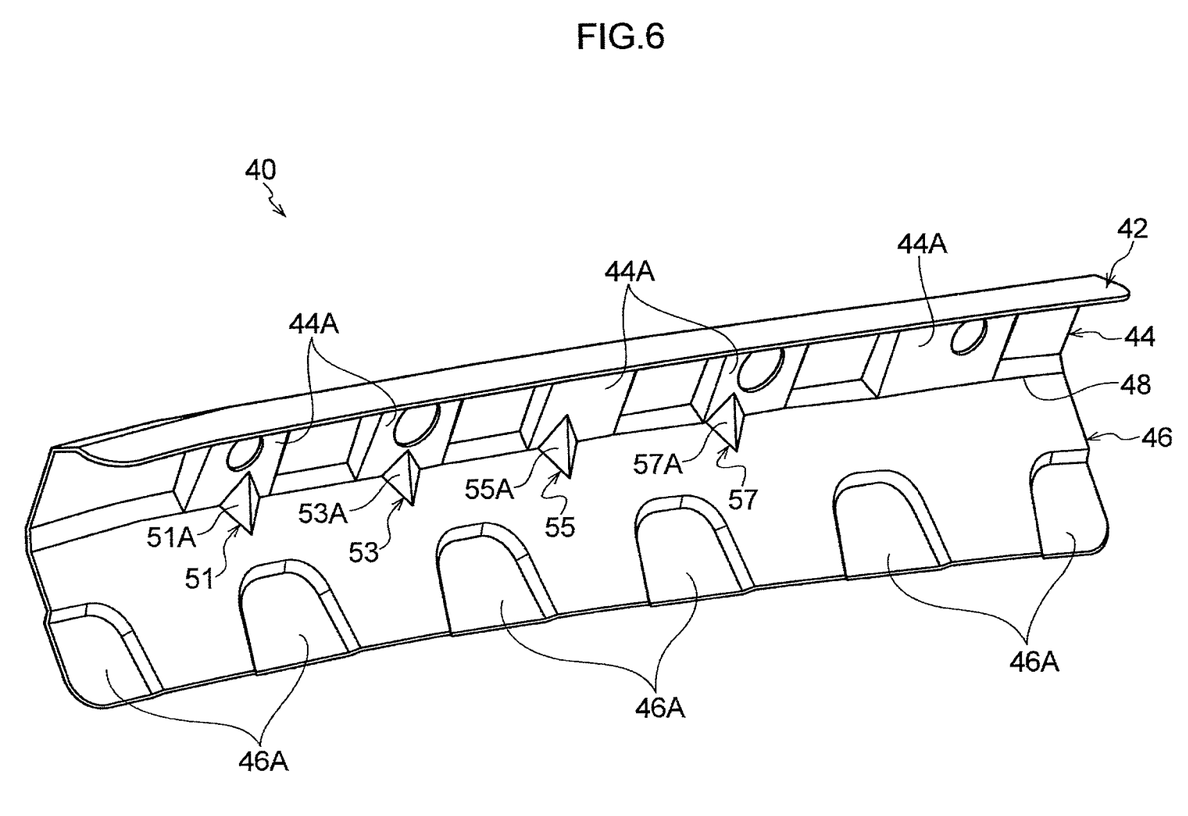
FIG. 6 is a perspective view of a reinforcement patch in accordance with a variant example of the present exemplary embodiment.

The beads 50, 52, 54 and 56 according to the present exemplary embodiment are formed in shapes with top faces. However, the beads may be formed in alternative shapes. For example, as illustrated in FIG. 6, so-called triangular beads 51, 53, 55 and 57 that do not have top faces may be formed. In this case, respective pairs of side faces 51A, 53A, 55A and 57A may share top edges 51B, 53B, 55B and 57B, respectively, to form the so-called triangular beads. According to this shape, the beads may be formed to be relatively small. Thus, positional adjustments of other portions such as, for example, spot welding spots and the like may be made easier, and a degree of flexibility of bead formation may be raised.

In the present exemplary embodiment, an example is described in which the present invention is applied to the joining portion between a roof side rail and a center pillar upper portion. However, the present invention may also be applied to joining portions between a roof side rail and upper portions of pillars other than a center pillar. For example, the present invention may be applied at a front pillar and a rear pillar.

What is claimed is:

1. A vehicle side portion structure comprising:
   a roof side rail including:
      a rail outer reinforcement that extends in a vehicle front-and-rear direction, a cross-sectional shape of which protrudes to a vehicle width direction outer side, the cross-sectional shape being structured by an upper wall portion and a lower wall portion, and an outer ridgeline being formed between the upper wall portion and the lower wall portion, and
      a rail inner panel that is disposed at a vehicle inner side relative to the rail outer reinforcement and that forms a closed cross section between the rail outer reinforcement and the rail inner panel;
   a pillar that extends in a vehicle up-and-down direction at a vehicle side portion, an upper end portion of the pillar being joined to the vehicle width direction outer side of the rail outer reinforcement; and
   a reinforcement member that is disposed along the rail outer reinforcement at the vehicle inner side of the rail outer reinforcement, the reinforcement member including:
      an upper reinforcing portion that is disposed along the upper wall portion,
      a lower reinforcing portion that is disposed along the lower wall portion,
      a reinforcement front-and-rear ridgeline along the outer ridgeline between the upper reinforcing portion and the lower reinforcing portion, and
      a bead that protrudes to the vehicle inner side relative to the reinforcement front-and-rear ridgeline and connects between the upper reinforcing portion and the lower reinforcing portion.

2. The vehicle side portion structure according to claim 1, wherein:
   a pair of pillar up-and-down ridgelines are formed at the pillar, the pillar up-and-down ridgelines being spaced apart from one another in the vehicle front-and-rear direction and extending in the vehicle up-and-down direction, and
   the bead is disposed in a region between projection lines of the pair of pillar up-and-down ridgelines.

3. The vehicle side portion structure according to claim 2, wherein the bead is plurally formed in the region between projection lines, the beads being spaced apart.

4. The vehicle side portion structure according to claim 2, wherein the bead is formed at at least one of the vehicle front-and-rear direction front side or rear side relative to the region between projection lines.

5. The vehicle side portion structure according to claim 1, wherein the upper end portion of the pillar, the rail outer reinforcement and the reinforcement member are integrally joined.

6. The vehicle side portion structure according to claim 1, wherein both vehicle up-and-down direction end portions of the bead are disposed at positions that are equidistant from the reinforcement front-and-rear ridgeline.

* * * * *